(12) United States Patent
Jaipaul et al.

(10) Patent No.: US 12,095,300 B2
(45) Date of Patent: Sep. 17, 2024

(54) BATTERY MANAGEMENT SYSTEM FOR VEHICLE LIFTS

(71) Applicant: Gray Manufacturing Company, Inc., St. Joseph, MO (US)

(72) Inventors: Larry M. Jaipaul, Clarence, NY (US); Raymond W. Karleskint, Clarksdale, MO (US)

(73) Assignee: Gray Manufacturing Company, Inc., St. Joseph, MO (US)

( * ) Notice: Subject to any disclaimer, the term of this patent is extended or adjusted under 35 U.S.C. 154(b) by 759 days.

(21) Appl. No.: 17/069,901

(22) Filed: Oct. 14, 2020

(65) Prior Publication Data
US 2021/0119455 A1  Apr. 22, 2021

Related U.S. Application Data

(60) Provisional application No. 62/916,875, filed on Oct. 18, 2019.

(51) Int. Cl.
*H02J 7/00* (2006.01)
*B66F 11/04* (2006.01)

(52) U.S. Cl.
CPC .............. *H02J 7/005* (2020.01); *B66F 11/04* (2013.01); *H02J 7/0013* (2013.01); *H02J 7/00302* (2020.01); *H02J 7/00306* (2020.01); *H02J 7/00309* (2020.01)

(58) Field of Classification Search
USPC ................................................. 320/134–136
See application file for complete search history.

(56) References Cited

U.S. PATENT DOCUMENTS

| 3,576,488 A | * | 4/1971 | Zug ................... G01R 19/16542 340/661 |
| 2006/0170391 A1 | * | 8/2006 | Lam ...................... H01M 10/44 320/101 |
| 2013/0240300 A1 | * | 9/2013 | Fagan ..................... B66F 13/00 187/203 |
| 2015/0171642 A1 | * | 6/2015 | Kato ................... H01M 10/482 320/107 |

(Continued)

OTHER PUBLICATIONS

JP 201598543 (Year: 2015).*

(Continued)

*Primary Examiner* — Samuel Berhanu
(74) *Attorney, Agent, or Firm* — Hovey Williams LLP; Kameron D. Kelly

(57) ABSTRACT

A portable vehicle lift and methods of using the same is provided. The lift includes a power system, a control system, one or more batteries, and a battery management system. The control system controls the power system. The one or more batteries powers the power system. The battery management system (BMS) is configured to monitor data about the one or more batteries. The BMS may be configured to connect and/or disconnect the one or more batteries, or one or more individual battery cells, based on the data. The data may include current flowing into or out of the one or more batteries, the voltage of the one or more batteries, the level of charge of the one or more batteries, the temperature of the one or more batteries, the life expectancy of the one or more batteries, or the like.

18 Claims, 6 Drawing Sheets

(56) References Cited

U.S. PATENT DOCUMENTS

2016/0325626 A1* 11/2016 Honda .................. B60L 3/12

OTHER PUBLICATIONS

Wikipedia Page for "Battey management system", https://en.wikipedia.org/wiki/Battery_management_system, 6 pages.
RoboteQ a NIDEC brand, RIOX—Robot IO eXtender, https://www.roboteq.com/index.php/roboteq-products-and-services/peripherals-extenders, 9 pages.
Orion BMS, AN 1086, How the BMS Works, https://www.orionbms.com/general/how-it-works/, Copyright 2019 Ewert Energy Systems, 2 pages.
Lion Smart Battery Management System (BMS), https://lionsmart.com/en/battery-management-system/, 6 pages.

* cited by examiner

BATTERY MANAGEMENT SYSTEM FOR VEHICLE LIFTS

RELATED APPLICATIONS

This application claims the priority benefit under 35 U.S.C. § 119(e) of U.S. Provisional Patent Application Ser. No. 62/916,875 entitled "BATTERY MANAGEMENT SYSTEM FOR VEHICLE LIFTS," filed Oct. 18, 2019, the entire disclosure of which is incorporated herein by reference.

FIELD OF THE INVENTION

The present invention generally relates to vehicle lift systems. More particularly, the invention concerns a portable vehicle lift system having a battery management system.

BACKGROUND

The need to lift a vehicle from the ground for service work is well established. For instance, it is often necessary to lift a vehicle for tire rotation or replacement, steering alignment, oil changes, brake inspections, exhaust work, and other automotive maintenance. Traditionally, lifting a vehicle has been accomplished through the use of equipment that is built-into the service facility, such as either lift units with the hydraulic actuator(s) installed below the surface of the floor or two and four post-type lift systems installed on the floor surface.

In an effort to increase the versatility and mobility of lift devices and to reduce the need to invest in permanently mounted lifting equipment, devices commonly known as a mobile column lifts (MCL's) have been developed. An apparatus for lifting a vehicle using multiple MCL's is described in U.S. Pat. No. 6,315,079 to Berends et al. Another apparatus for lifting a vehicle using multiple MCL's is described in U.S. Pat. No. 6,634,461, the entire disclosures of both patents are incorporated herein by reference. Notably, the device disclosed in '461 patent includes multiple MCL's that are powered by rechargeable batteries within each lift unit.

As indicated above, prior MCL systems generally utilize electrically-powered hydraulic lifting systems that require lead-acid batteries to provide the necessary energy. However, lead-acid batteries often experience substantially shorter lives than rated, or fewer charge/discharge cycles, particularly when the lifts are used while the lead-acid batteries are deeply discharged (e.g., low on power). Lead-acid batteries also have low energy density and high weight density, which makes them heavy and bulky. Additionally, when the lead-acid batteries are in use, their voltages often decrease, which results in lower torque for any motors being supplied.

Accordingly, there remains a need for a mobile lift system that permits users to perform remote lifting operations with longer lifespans and better performance.

SUMMARY

Embodiments of the present technology relate to portable lift systems and methods for operation. In one aspect, a portable vehicle lift is provided. The lift includes a base, a post, a carriage assembly, a hydraulic power system, a control system, one or more batteries, and a battery management system. The hydraulic power system comprises a hydraulic reservoir, a hydraulic pump, and a hydraulic cylinder. The control system controls the hydraulic power system. The one or more batteries powers the hydraulic power system. The battery management system (BMS) is configured to monitor data related to the one or more batteries. The BMS may be configured to connect and/or disconnect the batteries based on the data. The data may include information regarding the batteries' state of health, such as the current flowing into or out of the batteries, the voltage of the batteries, the level of charge of the batteries, the temperature of the batteries, the life expectancy of the batteries, or the like. By monitoring data of the batteries via the BMS, the lifespan and performance of the batteries improve. For example, the BMS may ensure that the batteries are maintained at the proper voltage range and are properly balanced during use and charging. Additionally, the BMS enables the batteries to comprise battery cells with higher energy densities, such as lithium-ion.

One or more embodiments of the present technology relate to a vehicle lift. Generally, the vehicle lift may comprise a power system for actuating the vehicle lift; one or more batteries for providing electrical power to the power system; and a battery management system (BMS) configured to monitor data related to the one or more batteries. Furthermore, the data may include voltages and current draws for the batteries and the BMS may be configured to monitor the voltages and current draws during charging and discharging of the batteries.

One or more embodiments of the present technology relate to a vehicle lift. Generally, the vehicle lift may comprise a power system for actuating the vehicle lift; one or more batteries for providing electrical power to the power system; and a battery management system (BMS) configured to monitor data related to the one or more batteries. Furthermore, the data may include voltages and current draws for the batteries and the BMS may be configured to monitor the voltages and current draws during charging and discharging of the batteries. Additionally, the BMS may be further configured to generate a state of health of the batteries, wherein the state of health comprises available Amp hours (Ah) or Watt hours (Wh) for the batteries.

One or more embodiments of the present technology relate to a vehicle lift system comprising two or more portable lifts. Generally, each of the portable lifts may comprise a power system for actuating the vehicle lift; a control system for controlling the power system; one or more batteries for providing electrical power to the power system; and a battery management system (BMS) configured to monitor data related to the one or more batteries and send the data to the control system. Furthermore, the data may include voltages and current draws for the batteries and the BMS may be configured to monitor the voltages and current draws during charging and discharging of the batteries. Additionally, the control systems of the two or more portable lifts may be configured to transmit data about their respective batteries to each other.

One or more embodiments of the present technology relate to a vehicle lift system comprising two or more portable lifts. Generally, each of the portable lifts may comprise a power system for actuating the vehicle lift; a control system for controlling the power system; one or more batteries for providing electrical power to the power system; and a battery management system (BMS) configured to monitor data related to the one or more batteries and send the data to the control system. Furthermore, the data may include voltages and current draws for the batteries and the BMS may be configured to monitor the voltages and current draws during charging and discharging of the batteries. Additionally, the control systems of the two or more portable lifts may be configured to transmit data about their respective batteries to each other. Moreover, the BMS may be further configured to generate a state of health of the batteries, wherein the state of health comprises available Amp hours (Ah) or Watt hours (Wh) for the batteries.

One or more embodiments of the present technology relate to a method of using a vehicle lift system to raise a vehicle. Generally, the method comprises: (a) providing two or more lifts, with each lift comprising a power system for actuating the lift, a control system for controlling the power system, one or more batteries for providing electrical power to the power system, and a battery management system (BMS) configured to monitor data related to the one or more batteries and send the data to the control system; (b) receiving an input indicative of an instruction to raise the vehicle; (c) determining, via the BMS, whether the one or more batteries of each lift has sufficient electrical power remaining to lift the vehicle; and (d) raising the vehicle by vertically actuating each of the lifts. Additionally, the control systems of the two or more portable lifts may be configured to transmit data about their respective batteries to each other.

One or more embodiments of the present technology relate to a method of charging a vehicle lift. Generally, the method comprises: (a) providing a vehicle lift comprising a power system for actuating the lift, a control system for controlling the power system, one or more batteries for providing electrical power to the power system and comprising one or more battery cells, a battery management system (BMS) configured to monitor data related to the one or more batteries and send the data to the control system, and a charging system comprising a receptacle for receiving power, an extension cord having an extendable male end and a female end that plugs into the receptacle, and a cord reel that houses the extendable end of the extension cord; (b) plugging the female end of the extension cord into the receptacle; (c) extending the male end of the extension cord out of the housing of the cord reel and plugging the male end into a power source; (d) electrically connecting, via the BMS, the one or more battery cells of the one or more batteries to the charging system; and (e) monitoring a current flowing into the one or more battery cells.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION OF PREFERRED EMBODIMENTS

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
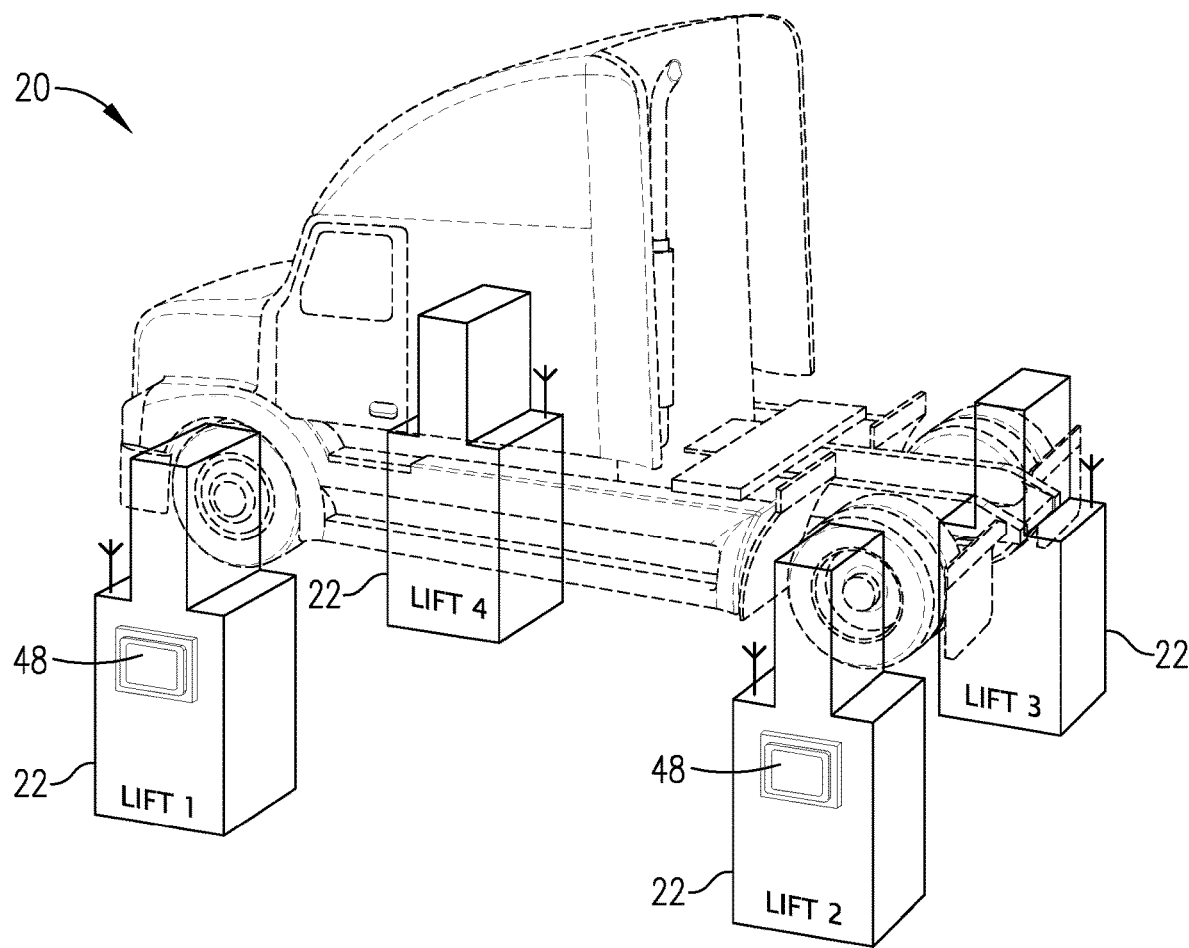
FIG. 1 illustrates an exemplary portable lift system according to embodiments of the present invention.

Referring now to the drawings, and initially to FIG. 1, numeral 20 generally designates a portable vehicle lift system having four individual lifts 22. This vehicle lift system is similar, in certain respects, to the vehicle lift system described in U.S. Patent App. Publ. No. 2013/0240300, with such reference being incorporated by reference herein in its entirety. Distinguishingly, the portable vehicle lift system of the present invention comprises a battery management system (BMS). As noted above, the BMS can help monitor a battery's state of health, optimize the charging and discharging voltage and current for the battery, and may help protect the battery from: (i) being overcharged during charging, (ii) being overly discharged from low voltages, and/or (iii) current draws that are too high while the battery is either charging or discharging. As discussed below in greater detail, the BMS may monitor: (i) the voltage of the battery and its individual cells; (ii) the temperature of the battery and its individual cells; (iii) the current being discharged and/or charged from the battery and its individual cells; and/or (iv) the state and longevity of the health/charge of the battery and its individual cells (e.g., by measuring and monitoring the Amp hours (Ah) or Watt hours (Wh)).

Returning to the drawings of the present application, although FIG. 1 depicts a four-lift system, it should be understood that any combination of two or more lifts can be used. For example, the lift system 20 can employ at least two, four, six, eight, or generally any number of individual lifts 22. In certain embodiments, each of the portable lifts 22 are substantially identical. It should also be understood that lift system 20 is not limited for use with vehicles, but also may be used to raise or lower other objects relative to a floor or ground surface, such as aircraft, industrial machinery, shipping containers, construction subassemblies, and the like.

The portable vehicle lift system 20 depicted in FIG. 1 can be equipped with a battery-powered lift system that provides power to multiple components of the vehicle lift system. Furthermore, the vehicle lift system 20 includes an electronic control system that controls the portable lifts 22 in response to operator commands. The electronic control system can include a wireless communication system that wirelessly communicates lift control signals to, from, and/or among the lifts 22, including the other electronic control systems from these other lifts 22.

As shown in FIG. 1, all of the individual lifts 22 of the lift system 20 can be equipped with a user interface 48 that, after initial set-up of the lift system 20, permits the entire lift system 20 to be controlled via a single user interface 48. The user interface 48 can include a touch screen display that enables enhanced operating features of the lift system 20. For example, when the user interface 48 includes a touch screen display that can be programmed to display a real time animation of the lift positions and/or the vehicle position as the vehicle is lifted and/or lowered by the lift system 20 via the lifts 22.

Figure 2:
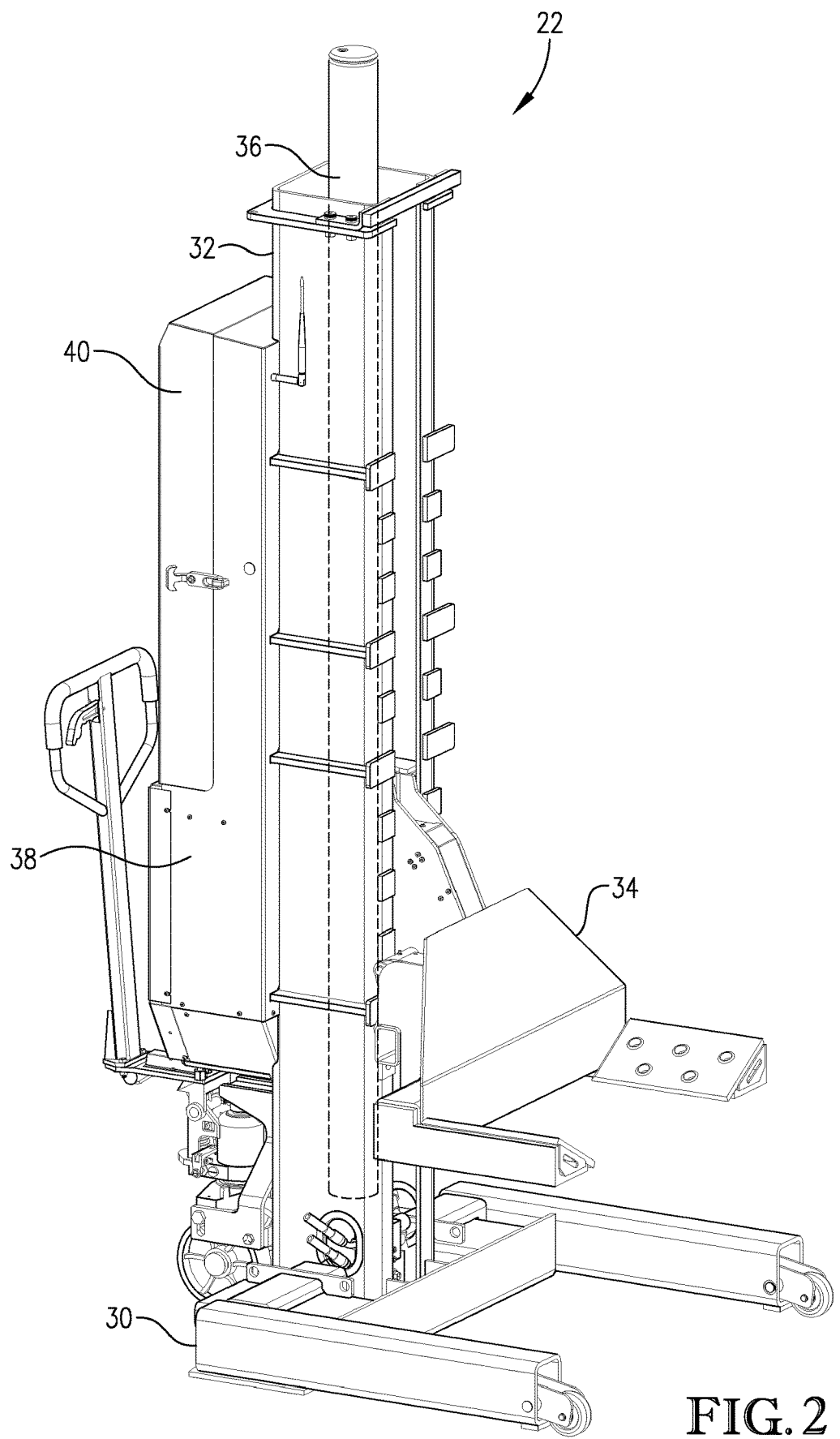
FIG. 2 illustrates a portable lift of the portable lift system depicted in FIG. 1.
Figure 3A:
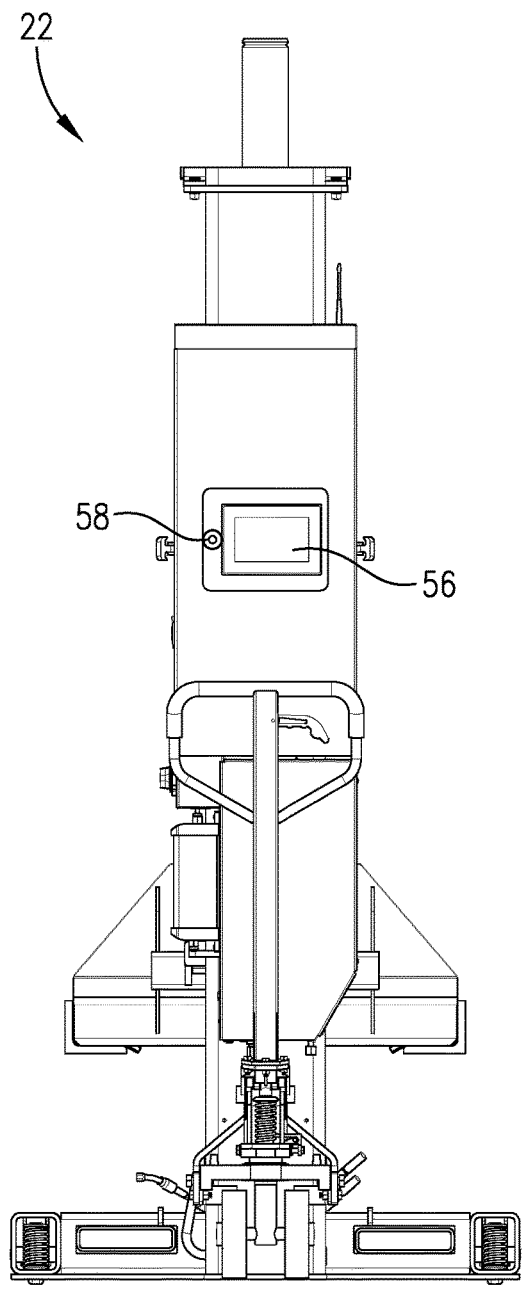
FIG. 3a illustrates various components of the portable lift.
Figure 3B:
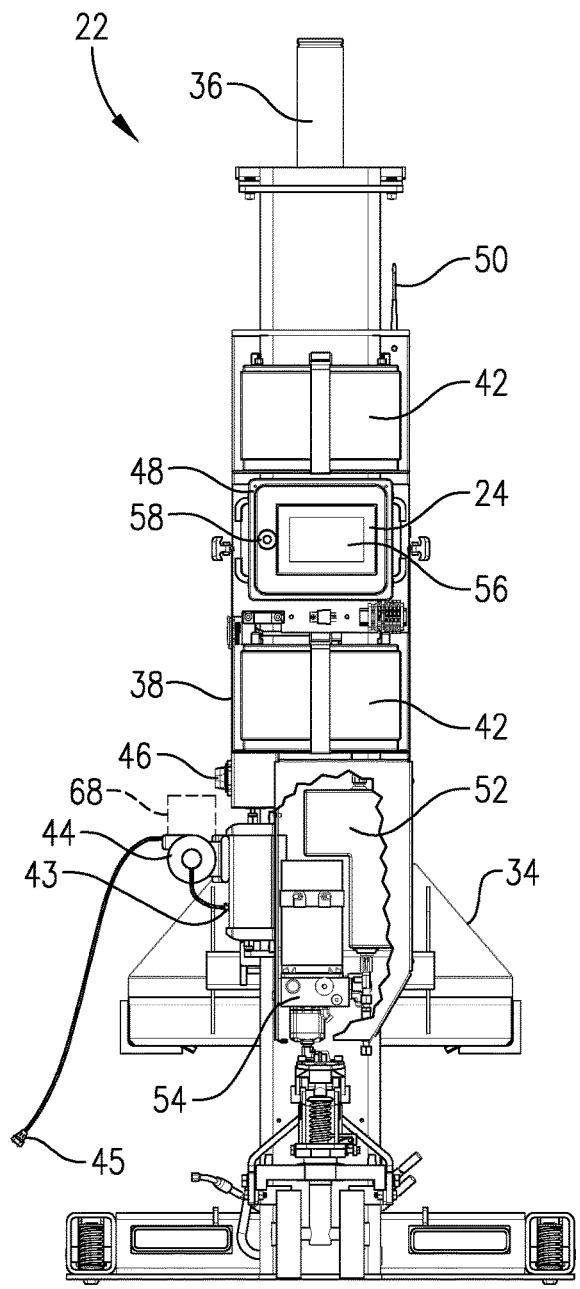
FIG. 3b illustrates additional various components of the portable lift.

Turning now to FIGS. 2, 3a, and 3b, a wireless portable lift 22 configured in accordance with one embodiment of the present invention is illustrated. Each lift 22 can include a base 30, a post 32, a carriage assembly 34, a lift actuator 36, a main housing 38, a hydraulic lift system, an electronic control system, a battery management system (BMS), a battery system, and a charging system optionally comprising one or more fuel cells 68. The base 30 supports the lift on the floor or the ground. The post 32 is rigidly coupled to the base 30 and extends upwardly therefrom. The carriage assembly 34 is configured to engage a wheel of a vehicle and is vertically shiftable relative to the post 32. The lift actuator 36 is received in the post 32 and is operable to vertically raise and lower the carriage assembly 34 relative to the post 32 and the base 30. The main housing 38 is attached to the post 32 and encloses many of the components that make up the power system and the electronic control system of the lift 22. The main housing 38 includes a removable access panel for providing access to various components of the power and control systems. In some embodiments, certain components of the power and control systems will be located outside of the main housing 38.

FIG. 3b provides a view of the back of a lift 22 with the access panel being removed to show certain internal components located in the upper portion of the main housing 38. In FIG. 3b, a lower portion of the main housing 38 is also cut away to show certain internal components located in the lower portion of the main housing 38.

The hydraulic power system of the lift 22 may include a hydraulic reservoir 52, a hydraulic pump 54, a hydraulic cylinder, and various valves, including: a pump valve, a lowering valve, and a dump valve. In some embodiments, the valves will be associated with solenoids that activate or deactivate their corresponding valves in response to an electrical signal. As such, the hydraulic valves are used to control the movement of the lift's 22 carriage 34 relative to post 32 by controlling hydraulic fluid being applied to the hydraulic cylinder. In particular, with the pump valve in an open position, the hydraulic pump is operable to move fluid from the hydraulic reservoir to the hydraulic cylinder, so as to cause the hydraulic cylinder to rise. Contrastingly, when the lowering valve is activated, hydraulic fluid is released from the hydraulic cylinder to thereby lower the hydraulic cylinder toward the surface under the influence of gravity. Finally, the dump valve is operable to generally maintain the position of the hydraulic cylinder in a static position. The dump valve can be shiftable between a powering configuration and a recirculating configuration. When the dump valve is in the powering configuration, the dump valve routes hydraulic fluid from the hydraulic pump to the hydraulic cylinder for use in raising the carriage assembly 34. When the dump valve is in the recirculating configuration, the dump valve routes (recirculates) hydraulic fluid from the hydraulic pump back to the hydraulic reservoir, thus bypassing the hydraulic cylinder and causing it to maintain a static position.

An important feature of the dump valve is that it is biased toward the recirculating configuration and is only shifted into the powering configuration when electrical power is supplied to the dump valve. As such, if electrical power is cut to the dump valve, the dump valve automatically shifts into the recirculating configuration. Once the dump valve is in the recirculating configuration, the hydraulic cylinder cannot be used to raise the carriage assembly, even if the hydraulic pump continues to run, because hydraulic fluid is diverted around the hydraulic cylinder and back to the reservoir.

Certain embodiments of the present invention additionally include a safety release valve, which is a backup mechanism that normally tasks upon the failure of cylinder assembly to prevent the carriage 34 from inadvertently falling downwardly toward the ground. During the normal lowering operation of the lift system, both the lowering valve and the safety release valve may be activated to release the carriage 34 and allow it to lower.

In accordance with certain embodiments of the present invention, the hydraulic power system will include one or more features for enhancing performance and reliability of the hydraulic power system. For example, as shown in FIG. 3b, the hydraulic pump 54 can have a fluid inlet that is located below the fluid outlet of the hydraulic reservoir 52. This configuration can be advantageous in that it facilitates gravity feed of hydraulic fluid from the hydraulic reservoir to the hydraulic pump 54. This gravity-feed feature provides improved energy efficiency over conventional portable lift systems because the hydraulic pump 54 is not required to pump hydraulic fluid up from the reservoir 52 every time the lift 22 is actuated. In addition, the tank used as the hydraulic reservoir 52 can have an enhanced physical configuration. In certain embodiment the hydraulic reservoir 52 can be non-cylindrical, with substantially planar side walls. In one embodiment, the hydraulic reservoir 52 has a generally inverted L configuration, with the hydraulic pump 54 and/or dump valve being at least partly received in the gap of the inverted L.

The hydraulic cylinder may be configured to move the lift actuator 36 relative to the main housing 38. The cylinder may be engaged between the support frame in such a way that extension and retraction of the cylinder moves the actuator 36 and the carriage 34 upwardly or downwardly. The hydraulic pump may receive power from the batteries 42 and in combination with the associated hydraulic valves moves hydraulic fluid to the hydraulic cylinder in such a manner as to cause the hydraulic cylinder to extend. The extension of the hydraulic cylinder causes the carriage 34 to move upward relative to the ground surface. Contrastingly, as hydraulic fluid is removed from the hydraulic cylinder, the cylinder moves downwardly and carriage 34 is lowered by gravity. It should be understood that the hydraulic cylinder could alternatively be replaced by a pneumatic actuator, a motorized jackscrew (e.g., a screw-type actuator), or an equivalent kind of actuator. Further, a double acting cylinder to move the carriage 34 is within the scope of the present invention.

The electronic control system of the lift 22 may include a main power switch 46, a user interface 48, a display 56 (such as a touch screen), an emergency-stop switch 58, an antenna 50, various communication lines, and a control unit. The user interface 48 may be integrated with the display 56, such as for embodiments comprising a touch screen. The user interface 48 may additionally or alternatively comprise one or more inputs for receiving commands from a user, such as buttons, toggles, mouse pads, or the like.

The emergency-stop switch 58 is operable to be actuated by an operator of the lift system 20. Upon actuation, the electronic control system is configured to send a signal via a communication line to cut electrical power to the dump valve of the lift 22. In addition, when the emergency-stop switch 58 is actuated, the electronic control system of the lift 22 on which the emergency-stop was actuated wirelessly transmits an emergency-stop signal for receipt by the other lifts 22 of the system 20. Once the emergency-stop signal is received by the other lifts 22, power is cut to the dump valves of all the lifts 22 of the system 20. It is understood that the electronic control systems and/or the BMSs 24 of the lifts 22 may disconnect power to the dump valve by opening a circuit via a contact, such as a switch, relay, circuit breaker, transistor, or the like.

The antenna 50 and communication lines are provided for sending and/or receiving data and/or commands regarding the lifts 22. The antenna 50 and communication lines are connected to the control system and enable communication between the control system and other systems/components, such as the hydraulic power system, the BMS 24, other lifts 22, and/or a technician's device.

The control system may be configured to control activation of the local lift hydraulic cylinder and to communicate with the other control systems of other lifts 22 by wireless signals to coordinate the raising and/or lifting of a vehicle. The control system includes a controller or control processor, such as a microprocessor which is programmed to perform its desired control and communication tasks. A wireless transceiver, such as a radio frequency (RF) transceiver, is also mounted in the control system and is connected to the antenna 50 to radiate RF signals to transceivers in other control units and to receive signals therefrom. The transceiver includes circuitry which provides for operation on one of a plurality of RF channels which can be selected by the operator in the field, as will be described in more detail below.

The control system is interfaced to a number of components, designated as input components. One input component may be a height sensing detector or sensor, which determines the height of the carriage 34 relative to the ground and relays such information to the control unit. The height sensor is preferably a relative position sensor, such as one which employs an optical detector of spaced openings, markings, or the like. Such an optical detector (not shown) could be used with either a rotary or a linear set of markings. Alternatively, an absolute type of position encoder could be employed. Other input components may include the emergency-stop button 58, an interlock function switch, a mode selector switch, an up/down motion switch, and a communication channel selector switch. The emergency-stop button 58 enables an operator to instruct the control system to stop moving carriage 34. For safety, the interlock function switch is required to be engaged before lifting or lowering of the carriage 34 can occur. When the lift system is in a synchronized mode for coordinated lifting with other lifts 22, the interlock function also allows an operator to specify which one of the control units will be a master control box. Once a master control box is selected, the remaining control units may be designated as slave control boxes and operate under user control actions initiated at the master control box.

The mode selector switch allows the control system to be toggled between an off mode and a synchronized mode. The motion switch selects the direction of movement and causes the control system to initiate raising or lowering of the carriage 34 relative to the surface. The emergency-stop, interlock or motion input components described above may alternatively be activated by a remote control device by use of a wireless link. The channel selector switch enables the operator to select which RF channel the system will use to communicate among the individual lifts 22. It should be appreciated that it is within the scope of the present invention to provide for other input devices such as, but not limited to, a level sensor (not shown) adapted to determine the orientation of a lift.

The battery system may include one or more batteries 42 comprising one or more battery cells that supply electric power, via the BMS 24, to the other components on the lift 22 and specifically the hydraulic pump 54. Some embodiments of the present invention include multiple batteries 42 connected to each of the lifts 22 to increase the power capacity of the lift 22. Additionally, each battery 42 may comprise one or more battery cells. The batteries 42 may be rechargeable batteries of any kind without departing from the scope of the present invention, including lead-acid batteries. For example, the batteries 42 may comprise sodium-ion cells, potassium-ion cells, nickel-cadmium cells, nickel-metal hydride cells, magnesium-ion cells, flow batteries, metal-air batteries, molten-salt batteries, and in preferred embodiments, lithium-ion cells, such as lithium iron phosphate (LFP) cells and/or lithium titanate (LTO) cells. The aforementioned batteries may: (i) have a much longer life relative to lead-acid batteries, (ii) be deeply discharged without incurring permanent damage, (iii) have a much higher energy density, (iv) exhibit a flat voltage discharge curve, and/or (v) deliver a full rated number of Amp hours (Ah) regardless of discharge current. In certain embodiments, the battery system may include one or more lithium-ion batteries 42 comprising lithium iron phosphate (LFP) cells and/or lithium titanate (LTO) cells.

The batteries 42 can be of various sizes and have various power capacities. In some embodiments, the batteries 42 may range from a power capacity of about 1620 Watt-hours (Wh) to about 2400 Wh. In some embodiments, each battery 42 may have a power capacity of at least about 3600 Wh.

Embodiments with batteries 42 comprising sodium-ion cells, potassium-ion cells, nickel-cadmium cells, nickel-metal hydride cells, magnesium-ion cells, flow batteries, metal-air batteries, molten-salt batteries, or lithium-ion cells provide numerous advantages. The batteries 42 are longer lasting with significantly more charge/discharge cycles in their lifetimes. The batteries 42 may have charge/discharge cycles in the several thousands in their lifetimes, whereas lead-acid batteries may only have a few hundred. Additionally, deep discharge of the batteries 42 (when the batteries 42 are nearly completely discharged) does not substantially affect the lifetimes of the batteries 42. While discharging their energy, the batteries 42 also yield a generally constant voltage discharge curve, meaning the voltage during discharge of the batteries 42 remains substantially constant. This improves the performance of the lift 22 by providing the hydraulic pump 54 with a substantially constant voltage and so that the motor of the pump 54 may produce substantially constant torque to help smoothly lift and/or lower a load on the lift 22. Additionally, the batteries 42 provide their full charge capacity regardless of the magnitudes of their discharge currents. However, because the aforementioned types of batteries 42 often have higher power densities, they can cause severe damage if there is a malfunction or experience certain conditions. It is therefore important to monitor various aspects of the batteries 42 with the BMS 24.

Figure 4:
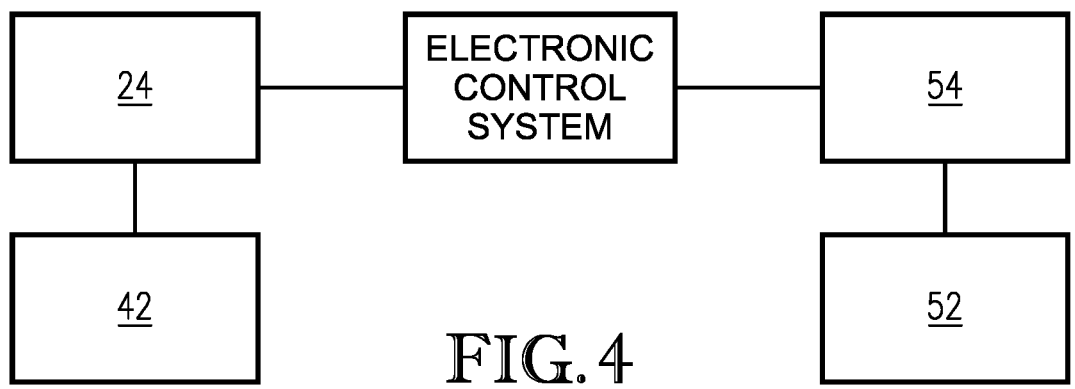
FIG. 4 illustrates various components of the portable lift shown in block schematic form.
Figure 5:
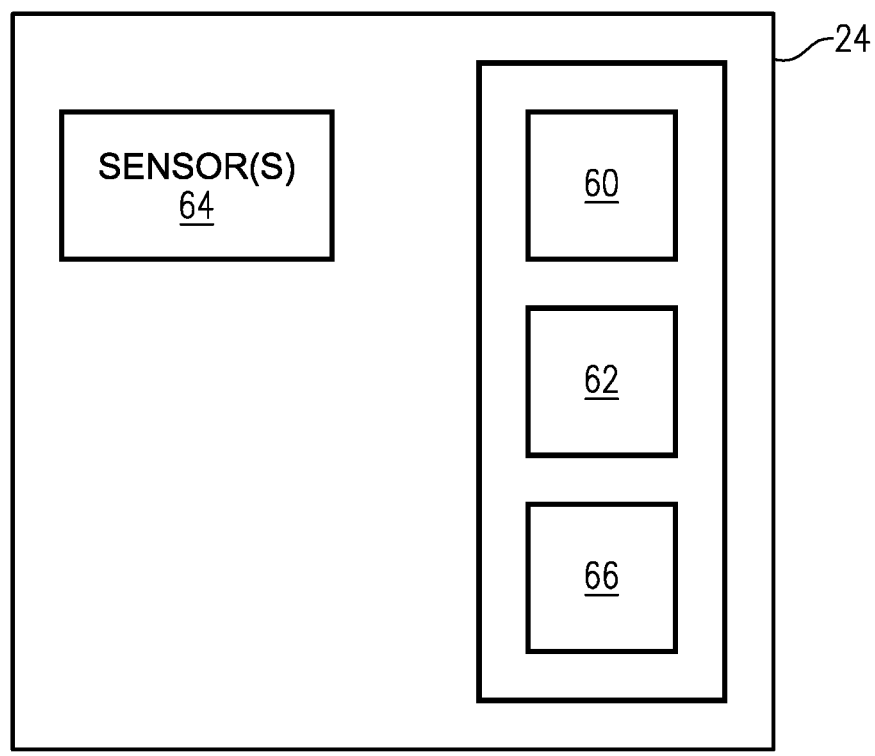
FIG. 5 illustrates various components of the BMS.

Turning to FIG. 4, the BMS 24 may be integrated with the electronic control system, and/or the BMS 24 may be mounted on or internal to one of the batteries 42. Alternatively, in certain embodiments, the BMS 24 may be mounted directly to the battery terminal. In some embodiments, each of the batteries 42 may have an internal BMS 24. As shown in FIG. 5, the BMS 24 may comprise a transceiver element 60, a memory element 62, one or more sensors 64, and a processing element 66. The transceiver element 60, memory element 62, and processing element 66 may be located on one or more circuit boards. The transceiver element 60 may generally allow communication with systems or devices external to the BMS 24. The transceiver element 60 may include signal or data transmitting and receiving circuits, such as antennas, amplifiers, filters, mixers, oscillators, digital signal processors (DSPs), and the like. The transceiver element 60 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The transceiver element 60 may also be in communication with the processing element 66 and the memory element 62. Additionally or alternatively, in certain embodiments, the transceiver element 60 may establish wired-based communication with external devices and systems via one or more wires and/or cables that comply with communication standards such as UTP cable, STP cable, coaxial cable, fiber optic cable, or combinations thereof.

The memory element 62 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 62 may be embedded in, or packaged in the same package as, the processing element 66. The memory element 62 may include, or may constitute, a "computer-readable medium". The memory element 62 may store the instructions, code, code segments, software, firmware, programs, applications, apps, services, daemons, or the like that are executed by the processing element. In particular, the memory element 62 may store information about a particular configuration of the batteries 42, the types of batteries 42, data regarding the batteries 42, data about the pump 54, or the like. The memory element 62 may also be able to store all the information gathered by the various sensors 64. This information may be accessible when the lift 22 is serviced so as to determine if the batteries 42 have been properly maintained.

The processing element 66 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 66 may generally execute, process, or run instructions, code, code segments, software, firmware, programs, applications, apps, processes, services, daemons, or the like. The processing element 66 may also include hardware components such as finite-state machines, sequential and combinational logic, and other electronic circuits that can perform the functions necessary for the operation of the current invention. The processing element 66 may be in communication with the other electronic components through serial or parallel links that include address busses, data busses, control lines, and the like. Certain of the functions, features, and/or steps described herein may be accomplished by the processing element 66 executing instructions (e.g., software) stored on the memory elements 62.

The sensors 64 of the BMS 24 may include current sensors, voltage sensors, temperature sensors, or the like. The BMS 24 may include current sensors arranged to sense the current from one or more of the cells of the batteries 42. The sensors 64 may include voltage sensors arranged to detect the voltage of one or more cells of the batteries 42. The temperature sensor of the BMS 24 may be arranged to sense internal and/or external temperatures of the batteries 42 and/or one or more of the cells of the batteries 42. Furthermore, in certain embodiments, the sensors 64 may include a dimensional measurement device, such as a strain gauge, to determine the condition of the battery. Such sensors may be mounted to a battery cell, such as a lithium ion battery cell, and could be used to measure the change in the cell dimensions to determine if the cell is expanding more than normal.

The processing element 66 of the BMS 24 may be configured to receive data from the sensors 64, communicate with other components of the lift 22 via the transceiver, store battery data and other information, and/or analyze battery data. The processing element 66 may be configured to receive data from the sensors 64 and analyze it to monitor: (i) current being discharged and/or charged of one or more cells of the batteries 42, (ii) a battery state of one or more cells of the batteries 42, (iii) a charge state of one or more cells of the batteries 42, and/or (iv) a battery health of one or more cells of the batteries 42. The processing element 66 of the BMS 24 may be configured to measure the amount of energy delivered in Amp hours (Ah) or Watt hours (Wh) and use this as a fuel gauge for the charge levels of the batteries 42. The processing element 66 of the BMS 24 may also be configured to track a number of Ah that is available after charging the batteries 42 over a predetermined time to determine a change in health of the batteries 42 and help predict their lifespans. For example, the BMS 24 may be configured to track the number of Ah discharged by one or more battery cells for each discharge cycle of the cells and determine a number of cycles remaining for the cells based, at least in part, on the number of Ah discharged for each discharge cycle. Furthermore, in certain embodiments, the BMS 24 may be configured to determine a remaining charge for one or more battery cells of one or more batteries based, at least in part, on the number of Ah discharged. Moreover, the BMS 24 may be configured to direct the electronic control system to disconnect/connect the batteries 42 and/or the BMS 24 may directly disconnect/connect the batteries 42 (or individual cells of the batteries 42).

Additionally or alternatively, in certain embodiments, the processing element 66 of the BMS 24 may also be configured to track the number of Wh discharged by one or more battery cells for each discharge cycle of the cells and determine a number of cycles remaining for the cells based, at least in part, on the number of Wh discharged for each discharge cycle. Furthermore, in certain embodiments, the BMS 24 may be configured to determine a remaining charge for one or more battery cells of one or more batteries based, at least in part, on the number of Wh discharged.

The processing element 66 of the BMS 24 may also be configured to communicate with the other systems via wired or wireless communication, such as with its transceiver. The BMS 24 may be configured to communicate with the electronic control system. The BMS 24 may be configured to send real time battery data, such as battery state of charge information to the electronic control system so that it can be depicted on the display 56 of the electronic control system. The BMS 24 may also be configured to send other real time information to the electronic control system for display, such as the voltage of one or more cells of the batteries 42, the current of one or more cells of the batteries 42, and/or the temperature of one or more cells of the batteries 42. The processing element 66 of the BMS 24 may also be configured to communicate with the charging system to optimize charging processes. The BMS 24 may be configured to store battery usage history and communicate this information to the electronic control system for displaying on the display 56 and/or an external device, such as a technician's device. Furthermore, in certain embodiments, the electronic control system may communicate with other electronic control systems of other lifts 22 and thereby transmit and share data regarding the respective batteries for each lift 22.

The processing element of the BMS 24 may be configured to store battery data on the memory element 62 of the BMS 24. The processing element of the BMS 24 may, for example, store current charge and discharge patterns and then analyze patterns. Additionally, any stored data may be transmitted to a technician's device and/or the electronic control system for displaying on the display 56 when the lift 22 is being serviced and/or inspected. This information can be used to determine if the batteries 42 have been properly maintained and estimate the remaining life of the batteries.

The BMS 24 provides numerous advantages. The BMS 24 protects the batteries 42 from being overcharged or overdischarged based on the sensed voltage of the batteries 42, or individual cells of the batteries 42. The BMS 24 also ensures all cells of the batteries 42 stay in the proper voltage range and are properly balanced. In other words, the BMS 24 may be configured to connect cells of the batteries 42 to charging power, such as from the charging system, when the cells are below a certain voltage and disconnect cells of the batteries 42 to charging power when the cells are above a certain voltage. Additionally, during discharge, such as when the electronic control system connects the hydraulic pump 54 to the BMS 24/batteries 42, the BMS 24 may be configured to protect the batteries 42 from low voltages that could damage electrode materials inside the batteries 42. The BMS 24 may also be configured to protect the batteries 42 from current draws that are too high while the batteries 42 are either charging or discharging. A high discharge current can overheat the batteries 42 which could damage the batteries 42 or result in a fire. This may be prevented by, for example, the BMS 24 having one or more current sensors 64 that sense the current of one or more of the cells of the batteries 42. The processor 66 of the BMS 24 may receive the sensed currents of the one or more cells and determine that one or more of the cells is receiving and/or outputting too much current. The BMS 24 may then cause such cells to be disconnected by opening a circuit via a contact, such as a switch, relay, circuit breaker, transistor, or the like, from one or more circuits so that no current flows to or out of those cells. The BMS 24 may also be configured to detect faults and/or short circuits and provide protection by disconnecting one or more of the batteries 42 from an electrical load, such as from the hydraulic pump 54, if a fault and/or short is detected. During charging the BMS 24 may be configured to either limit the amount of current allowed to flow to the batteries 42 or disconnect from the charging system, if needed, to maintain safety. In some embodiments, the BMS 24 may be configured to control the charging system to optimize the charging voltage and current for the batteries 42.

Returning to FIG. 3*b*, the charging system comprises a cord reel 44 that stores an electrical extension cord having a female end 43 for connecting to the charging system of the lift 22 and an extendable male end 45 for connecting to an outlet. The cord reel 44 may be biased, such as with a spring, to retract the male end 45 of the cord. The cord reel 44 may also have a locking mechanism configured to secure the male end 45 once it has been extended a length. The locking mechanism may unlock the male end 45 once it is pulled again so that the male end 45 of the cord retracts into the reel 44. The female end 43 may be configured to be received into a receptacle of the charging system so that AC power from the outlet may be passed to the charging system. The charging system, the BMS 24, and/or the electrical control system may include an AC to direct current (DC) converter for converting the AC power from the outlet into DC power to charge the batteries 42.

Additionally or alternatively, in certain embodiments, the charging system may comprise one or more fuel cells 68. Exemplary fuel cells 68 may include a hydrogen fuel cell, a methanol fuel cell, a methane fuel cell, a propane fuel cell, an ethanol fuel cell, an adaptive energy fuel cell, a solid oxide fuel cell, a proton exchange fuel cell, an alkaline fuel cell, a phosphoric acid fuel cell, a molten carbonate fuel cell, or a combination thereof. A fuel cell 68 is a device that generates electricity through an electrochemical reaction, not combustion. Generally, fuel cell systems may provide clean, efficient, reliable, and quiet sources of power. The fuel cells 68 may continue to produce electricity as long as a fuel source is provided. Furthermore, the fuel cells 68 may be easily refueled in a short amount of time by types of fuels that are readily available.

The fuel cells 68 may be used as a source of energy to recharge the batteries 42 through the BMS 24. The batteries 42 may provide the intermittent bursts of energy required for lifting and the fuel cells 68 may run nearly continuously to recharge the batteries. Consequently, this could reduce the wattage output required from the fuel cell and the lift operator would only be required to refuel the fuel cell to continue charging the batteries 42. In the event that fuel cells 68 are present in the charging system, then the BMS 24 may be used in conjunction with a wide array of batteries, including those discussed above and lead-acid batteries. Furthermore, in certain embodiments, the wattage output of the fuel cells 68 could be regulated to a lower level when the lift 22 is not raising a load.

In some embodiments, the lifts 22 will include electrical outlets for use by accessory tools. For example, in some embodiments, the lift will include a DC-to-AC converter for supplying power from the batteries 42 to the electrical outlet, which may be a standard 120V AC outlet operable to power accessory tools, such as lights, vacuums, air-compressors, electric wrenches, or the like. In other embodiments, the electrical outlets will also include a DC outlet, which may be capable of outputting varying levels of DC voltage and/or current. In still other embodiments, the lift mechanisms 22 will include an internal air-compressor that is powered by the electronic control system. The air-compressor may be used to provide compressed air to inflate the tires on the vehicle being serviced and/or pneumatic power for pneumatic tools, such as impact wrenches, air ratchets, sand blasters, paint sprayers, pneumatic drills, or the like.

In operation, one or more of the lifts 22 are first placed in a position to support a portion of a vehicle. The synchronized mode of operation allows input commands at one control unit to influence other control units within the system to provide a coordinated lift of the vehicle. Coordination of the lifting operation is required to maintain the lifted vehicle in a substantially level orientation, that is, to avoid tipping the vehicle or other load. A control system of each of the lifts 22 may also display the charge levels, voltage levels, and/or health of one or more of the batteries 42.

Once the control boxes have been turned on, the control systems of each of the lifts 22 may communicate at the same selected radio frequency. Each of the height sensors provides a height measurement to its respective control unit, and the control units provide the height measurement on the display 56. The BMSs 24 of the lifts 22 provide data (as discussed above) about their respective batteries 42 to their respective control unit, which provides it on the display 56.

When the pumps are activated, their respective BMSs 24 monitor the current, voltage, power output, charge levels, battery temperatures, etc. of one or more of the cells of the batteries 42. The BMSs 24 may be configured to selectively connect/disconnect one or more of the cells of the batteries 42 to ensure the correct power output is achieved and that none of the cells or groups of cells of the batteries 42 are discharging too much current.

Notwithstanding whether the vehicle is being raised or lowered as described above, the height sensors on each lift 22 determine the new height of the carriage relative to the surface, convey that information to their respective control units, provide the height on displays/user interfaces and wait for another command.

Once the lift 22 has facilitated a lift operation, the electronic control system may determine whether there is sufficient energy remaining in the batteries 42 of the lifts 22 so that a lowering operation can be carried out. A warning or notification may be displayed that the batteries 42 of one or more of the lifts 22 needs to be charged. Such functionality prevents short cycles that will pull more charge from the batteries 42 during a starting and lifting operation than will be put back within the battery during such starting and lifting operation.

The above described process for coordinating the lift of a structure using a plurality of hydraulic cylinders, provides an exemplary method of coordinating or synchronizing the cylinders, using wireless links between the lift mechanisms 22. Other methods for coordinating multiple lifting actuators using controllers interconnected by cables are known within the art, and information concerning one such method can be obtained by reference to U.S. Pat. No. 4,777,798, which is incorporated herein by reference.

Figure 6:
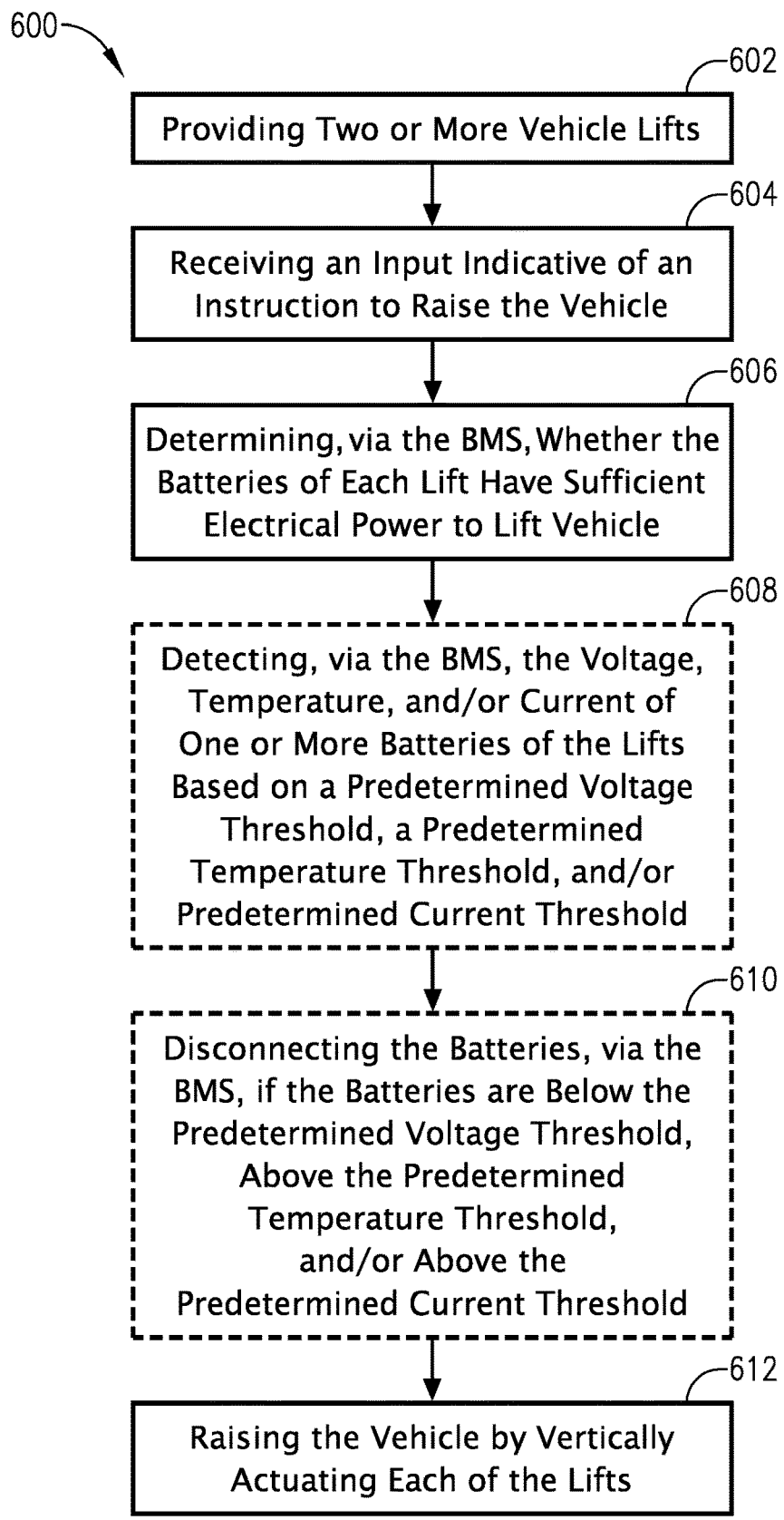
FIG. 6 illustrates a flow chart of an exemplary method for lifting a vehicle with the vehicle lift system.

FIG. 6 provides a flow chart of an exemplary method 600 for using the vehicle lift system 20 for raising a vehicle. As shown in FIG. 6, the method 600 may comprise providing 602 two or more lifts, with each lift comprising: (i) a power system for actuating the lift, (ii) a control system for controlling the power system, (iii) one or more batteries for providing electrical power to the power system, and (iv) a BMS configured to monitor data related to the one or more batteries and send the data to the control system. Subsequently, the method comprises receiving 604 an input indicative of an instruction to raise the vehicle and determining 606, via the BMS, whether the batteries of each lift have sufficient electrical power remaining to lift the vehicle. If sufficient electrical power remains in the batteries, then the next step involves raising 612 the vehicle by vertically actuating each of the lifts. During this lifting process, the control systems of the two or more portable lifts may be configured to transmit data about their respective batteries to each other via the BMS of each lift.

During the method depicted in FIG. 6, one may also carry out the additional step 608 of optionally detecting the voltage of one or more cells of the batteries, the temperature of one or more cells of the batteries, and/or the current flowing out one or more cells of the batteries of the two or more lifts via the BMS of the lift. More particularly, during these optional steps, it can be determined whether the voltage is below a predetermined threshold, the temperature is above a predetermined threshold, and/or if the current is above a predetermined threshold. In each of these cases, the BMS may optionally disconnect 610 one or more cells of the batteries if the predetermined threshold is not met and/or is exceeded.

Figure 7:
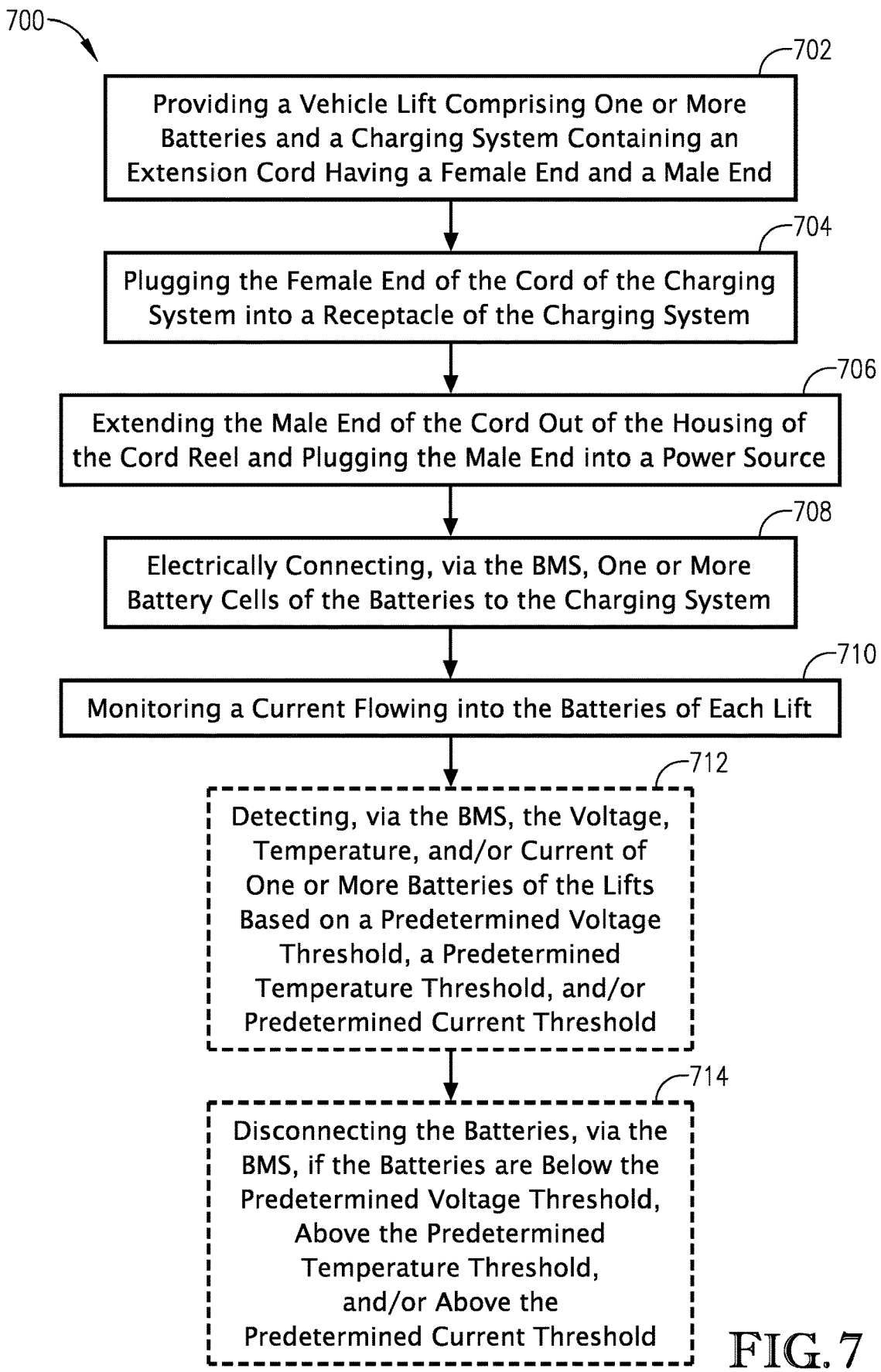
FIG. 7 illustrates a flow chart of an exemplary method for charging a battery of a vehicle lift.

FIG. 7 provides another flow chart of an exemplary method of charging a vehicle lift 22 containing the BMS 24. As shown in FIG. 7, the method 700 may comprise first providing 702 a vehicle lift comprising: (i) a power system for actuating the lift, (ii) a control system for controlling the power system, (iii) one or more batteries for providing electrical power to the power system and comprising one or more battery cells, (iv) a BMS configured to monitor data about the one or more batteries and send the data to the control system, and (v) a charging system comprising a receptacle for receiving power, an extension cord having an extendable male end and a female end that plugs into the receptacle, and a cord reel that houses the extendable end of the extension cord. Further, as shown in FIG. 7, the method subsequently involves plugging 704 the female end of the extension cord into the receptacle and extending 706 the male end of the extension cord out of the housing of the cord reel and plugging the male end into a power source. Afterwards, the method may involve electrically connecting 708, via the BMS, one or more battery cells of the one or more batteries to the charging system and monitoring 710 a current flowing into the battery cells.

During the method depicted in FIG. 7, one may also carry out the additional step of detecting 712 the voltage of one or more cells, the temperature of one or more cells, and/or the current flowing out one or more cells of the batteries of the lift via the BMS. More particularly, during these steps, it can be determined whether the voltage is below a predetermined threshold, the temperature is above a predetermined threshold, and/or if the current is above a predetermined threshold. In each of these cases, the BMS may disconnect 714 one or more cells of the batteries if the predetermined threshold is not met and/or is exceeded.

Given the description provided above, the present invention provides a lift system with an improved battery and a BMS that permits operators to perform remote lifting operations. Although the above description is directed to hydraulically powered lifts (e.g., hydraulic power systems), it should be understood that the BMS 24 may be used on other types of lifts, such as electrically powered lifts (e.g., electric power systems), mechanically powered lifts (e.g., mechanical power systems, such as screw type, chain & pulley, gear/ratchet, etc.), pneumatically powered lifts (e.g., pneumatic power systems), gas powered lifts (e.g., fuel power systems), etc.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

The invention claimed is:

1. A vehicle lift comprising:
    a power system for actuating said vehicle lift, wherein said power system comprises a hydraulic pump;
    one or more batteries for providing electrical power to said power system;
    a height sensor; and
    a battery management system (BMS) configured to monitor data related to said one or more batteries, wherein said data includes voltages and current draws for said one or more batteries, wherein said BMS is configured to monitor voltages and current draws during charging and discharging of said one or more batteries when said one or more batteries are electrically connected to said hydraulic pump,
    wherein said vehicle lift is configured to be wirelessly synchronized with at least one additional vehicle lift to provide a coordinated lifting operation of a vehicle, wherein the synchronized vehicle lifts are configured to maintain the vehicle in a substantially level orientation during the coordinated lifting operation,
    wherein upon performing the coordinated lifting operation, the vehicle lift is configured to determine, via the height sensor, a new height of the lift,
    wherein said vehicle lift is configured to transmit data about said one or more batteries to the at least one additional vehicle lift,
    wherein said vehicle lift is configured to determine, via said BMS, whether said one or more batteries has sufficient electrical power remaining to lower said vehicle after performing the coordinated lifting operation.

2. The vehicle lift according to claim 1, wherein said batteries comprise one or more cells comprising a lithium-ion battery cell, a sodium-ion battery cell, a potassium-ion battery cell, a nickel-cadmium battery cell, a nickel-metal hydride battery cell, a magnesium-ion battery cell, or combinations thereof.

3. The vehicle lift according to claim 1, wherein said batteries comprise one or more cells comprising a lithium-ion battery cell.

4. The vehicle lift according to claim 1, wherein said BMS comprises one or more sensors, wherein said one or more sensors comprise a current sensor configured to detect a current of one or more cells of said one or more batteries, a voltage sensor configured to detect a voltage of one or more cells of said one or more batteries, a temperature sensor configured to detect a temperature of one or more cells of said one or more batteries, or a combination thereof.

5. The vehicle lift according to claim 4, wherein said BMS is configured to:
    (i) track a number of Ampere-hours (Ah) discharged by said one or more cells of said one or more batteries; or
    (ii) track a number of Watt-hours (Wh) discharged by said one or more cells.

6. The vehicle lift according to claim 1, further comprising a control system for controlling said power system, wherein said BMS is configured to communicate with said control system and send data about said one or more batteries to said control system.

7. The vehicle lift according to claim 1, further comprising a charging system for charging said one or more batteries.

8. The vehicle lift according to claim 1, further comprising at least one fuel cell for charging said one or more batteries, wherein said fuel cell comprises one or more of the following: a hydrogen fuel cell, a methanol fuel cell, a methane fuel cell, a propane fuel cell, an ethanol fuel cell, an adaptive energy fuel cell, a solid oxide fuel cell, a proton exchange fuel cell, an alkaline fuel cell, a phosphoric acid fuel cell, and a molten carbonate fuel cell.

9. A vehicle lift system comprising:
    two or more portable lifts, each lift comprising—
        a power system for actuating said lift, wherein said power system comprises a hydraulic pump,
        a control system for controlling said power system,
        a height sensor,
        one or more batteries for providing electrical power to said power system, and
        a battery management system (BMS) configured to monitor data about said one or more batteries and to send the data to said control system, wherein said data includes voltages and current draws for said one or more batteries, wherein said BMS is configured to monitor voltages and current draws during charging and discharging of said one or more batteries when said one or more batteries are electrically connected to said hydraulic pump,
    wherein said two or more portable lifts are configured to be wirelessly synchronized to provide a coordinated lifting operation of a vehicle, wherein said two or more portable lifts are configured to maintain the vehicle in a substantially level orientation during the coordinated lifting operation,
    wherein upon performing the coordinated lifting operation, each lift is configured to determine, via the respective height sensor, a new height of the lift,
    wherein said control systems of said two or more portable lifts are configured to transmit data about their respective one or more batteries to each other,
    wherein said control systems of said two or more portable lifts are configured to determine, via said BMSs of said lifts, whether said one or more batteries of each lift has sufficient electrical power remaining to lower said vehicle from the new height after performing the coordinated lifting operation.

10. The vehicle lift system according to claim 9, wherein said one or more batteries of at least one of said two or more lifts comprise one or more cells comprising a lithium-ion battery cell, a sodium-ion battery cell, a potassium-ion battery cell, a nickel-cadmium battery cell, a nickel-metal hydride battery cell, a magnesium-ion battery cell, or combinations thereof.

11. The vehicle lift system according to claim 9, wherein said BMS of at least one of said two or more lifts comprises one or more sensors, wherein said one or more sensors comprise a current sensor configured to detect a current of one or more cells of said one or more batteries, a voltage sensor configured to detect a voltage of one or more cells of said one or more batteries, a temperature sensor configured to detect a temperature of one or more cells of said one or more batteries, or a combination thereof.

12. The vehicle lift system according to claim 9, wherein each lift further comprises a charging system for charging said one or more batteries.

13. The vehicle lift system according to claim 9, wherein each lift further comprises at least one fuel cell for charging said one or more batteries, wherein said fuel cell comprises one or more of the following: a hydrogen fuel cell, a methanol fuel cell, a methane fuel cell, a propane fuel cell, an ethanol fuel cell, an adaptive energy fuel cell, a solid oxide fuel cell, a proton exchange fuel cell, an alkaline fuel cell, a phosphoric acid fuel cell, and a molten carbonate fuel cell.

14. A method of using a vehicle lift system to raise a vehicle, said method comprising the steps of:
providing two or more lifts, each lift comprising—
a power system for actuating said lift, wherein said power system comprises a hydraulic pump,
a control system for controlling said power system,
a height sensor,
one or more batteries for providing electrical power to said power system, and
a battery management system (BMS) configured to monitor data about said one or more batteries and send said data to said control system, wherein said BMS is configured to monitor voltages and current draws during charging and discharging of said one or more batteries when said one or more batteries are electrically connected to said hydraulic pump,
wherein said control systems of said two or more lifts are configured to transmit data about their respective one or more batteries to each other;
wirelessly synchronizing the two or more lifts,
receiving an input indicative of an instruction to raise said vehicle;
determining, via said BMSs of the lifts, whether said one or more batteries of each lift has sufficient electrical power remaining to lift said vehicle; and
raising said vehicle by vertically actuating each of said lifts, wherein the two or more portable lifts are configured to maintain the vehicle in a substantially level orientation during said raising step;
upon performing said raising step, determining, via the height sensors, a new height of the lifts; and
determining, via the BMSs of the lifts, whether the one or more batteries of each lift has sufficient electrical power remaining to lower the vehicle after performing the coordinated lifting operation.

15. The method according to claim 14, wherein said one or more batteries of at least one of said two or more lifts comprise one or more cells comprising a lithium-ion battery cell, a sodium-ion battery cell, a potassium-ion battery cell, a nickel-cadmium battery cell, a nickel-metal hydride battery cell, a magnesium-ion battery cell, or combinations thereof.

16. The method according to claim 14, further comprising detecting a current flowing out one or more cells of said one or more batteries of at least one of said two or more lifts, determining whether said current is above a predetermined threshold, and disconnecting the one or more cells if said current is above said predetermined threshold.

17. The method according to claim 14, further comprising detecting a voltage of one or more cells of said one or more batteries of at least one of said two or more lifts, determining whether said voltage is below a predetermined threshold, and disconnecting said one or more cells if said voltage is below the predetermined threshold.

18. The method according to claim 14, further comprising detecting a temperature of one or more cells of said one or more batteries of at least one of said two or more lifts, determining whether said temperature is above a predetermined threshold, and disconnecting said one or more cells if said temperature is above said predetermined threshold.

* * * * *